March 21, 1961 — D. A. KOHL — 2,976,188
METHOD OF PRODUCING A HUMIDITY SENSER
Filed Nov. 25, 1955 — 3 Sheets-Sheet 1
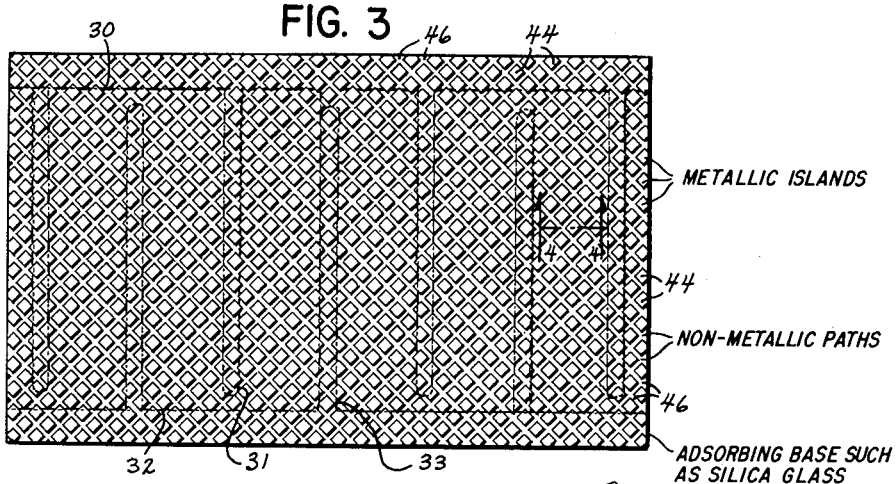
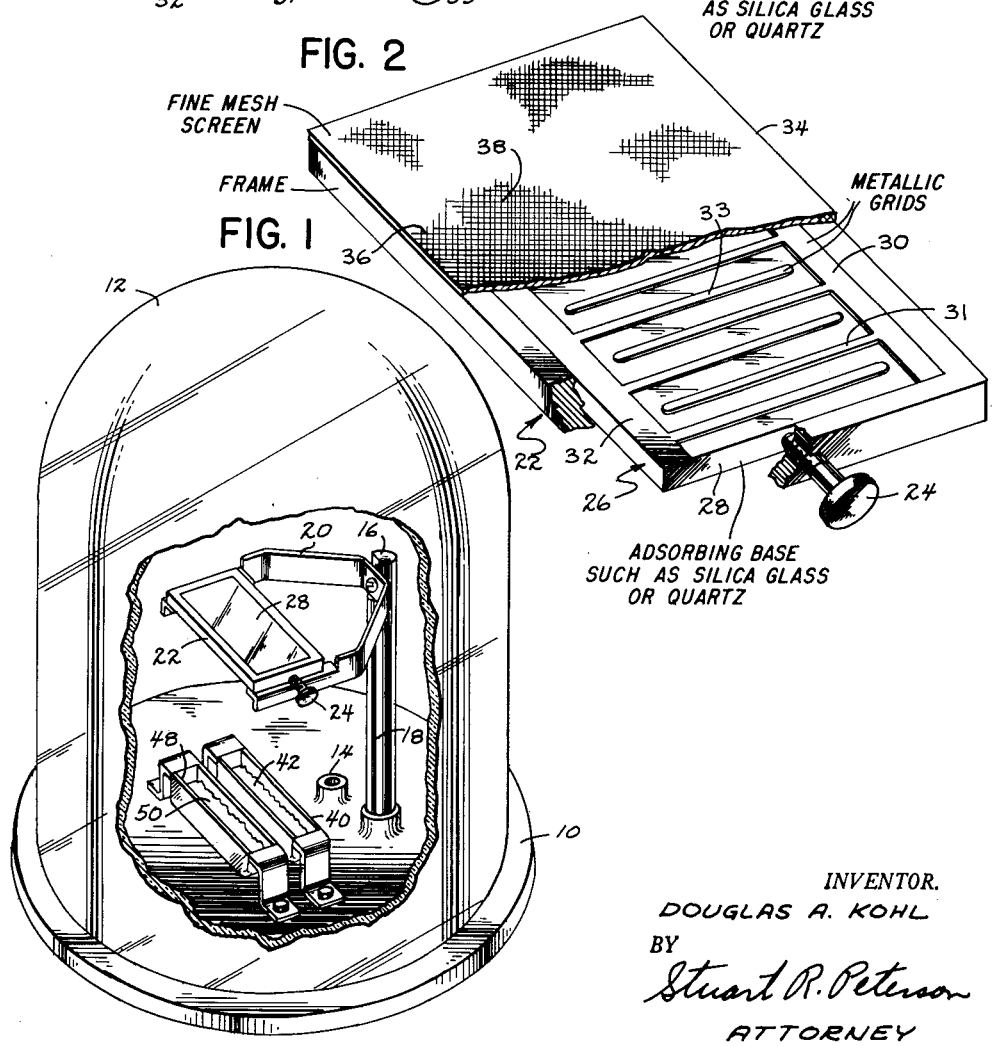
INVENTOR.
DOUGLAS A. KOHL
BY
Stuart R. Peterson
ATTORNEY

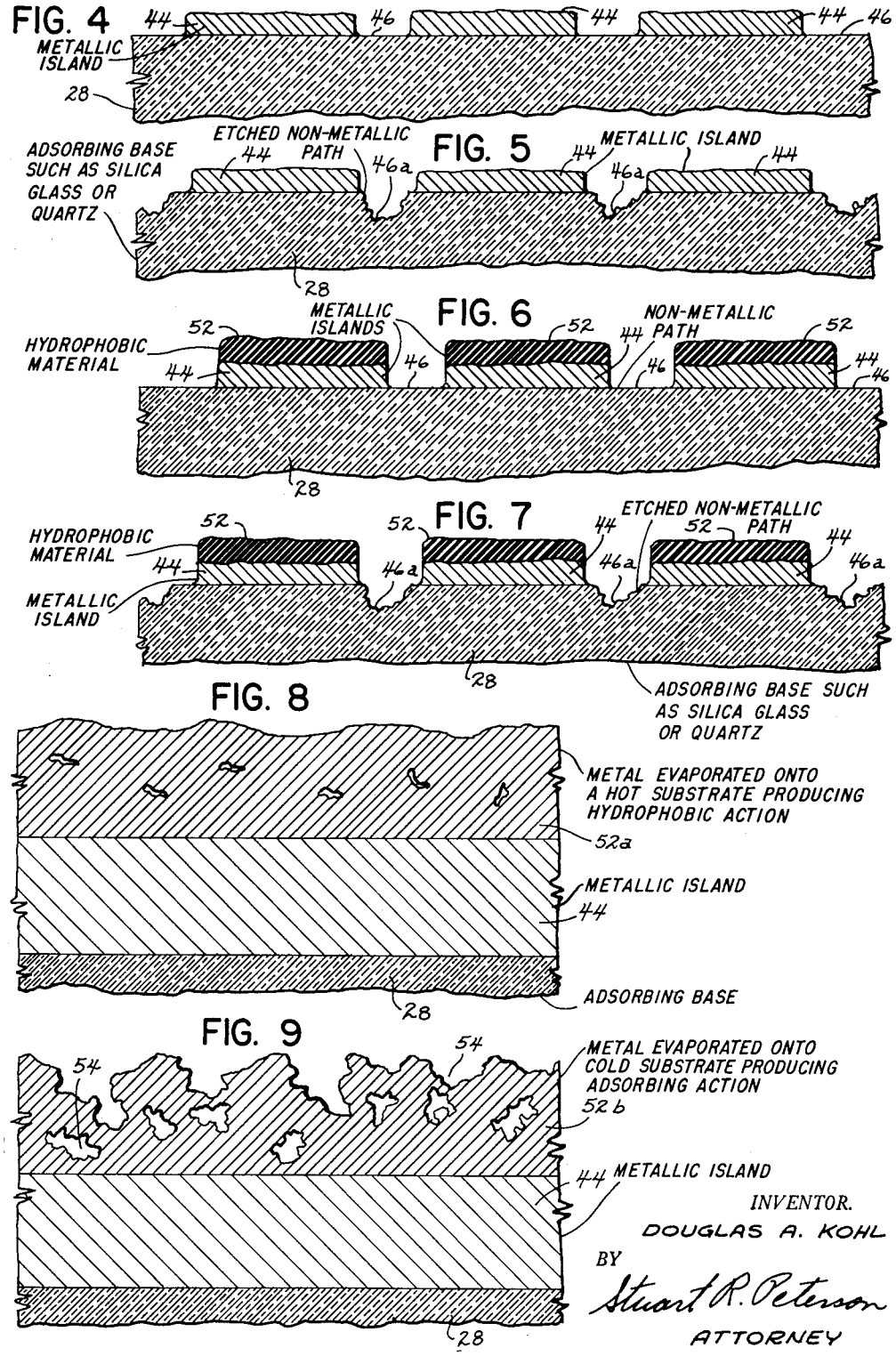

March 21, 1961  D. A. KOHL  2,976,188
METHOD OF PRODUCING A HUMIDITY SENSER
Filed Nov. 25, 1955  3 Sheets-Sheet 3

INVENTOR.
DOUGLAS A. KOHL
BY
Stuart R. Peterson
ATTORNEY

United States Patent Office 2,976,188
Patented Mar. 21, 1961

2,976,188

METHOD OF PRODUCING A HUMIDITY SENSER

Douglas A. Kohl, Osseo, Minn., assignor to General Mills, Inc., a corporation of Delaware Filed Nov. 25, 1955, Ser. No. 549,117

5 Claims. (Cl. 117—212)

This invention relates to a humidity sensor having a comparatively low resistance range and to a method of making such a sensor.

Frequently it happens that the resistance range of an adsorbing type humidity sensing element is entirely too high for proper and economical instrumentation. Accordingly, one object of the invention is to provide a humidity sensing element with a lowered resistance range to meet practical instrumentation requirements and which can be mass produced at a comparatively low cost.

Another object of the invention is to provide a method by which the degree of resistance range lowering can be accurately controlled to whatever extent is found desirable or expedient for the specific conditions to be encountered in use.

A further object of the invention is to provide a humidity sensing element that will possess resistance attributes that can be quite precisely duplicated between sensors. Stated in different words, the invention has for a view a method of fabricating a humidity sensor of such uniformity as to resistance range that another sensor made by the same method will have for all intents and purposes a like resistance range, thereby permitting substitution in operation of one element for another without having to recalibrate the associated measuring instruments.

Yet another object of the invention is to utilize the surface area of an adsorbing surface in such a way that any layer of moisture that may collect on the adsorbing surface owing to a particular humidity state will be effectively used in the determining of the resistance for that degree of humidity. More specifically, the invention envisages the formation of a multitude of metallic islands on the adsorbing surface and adding to these islands a layer of hydrophobic material substantially coextensive in area with these islands. Also, it is within the scope of the invention to enhance the resistance characteristics by etching those regions lying between the various metallic islands, either in conjunction with the aforesaid hydrophobic material or exclusive of same.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

Figure 1 is a perspective view partly broken away showing a suitable apparatus for carrying out the improved method or process embodying my invention;

Fig. 2 is a perspective view showing the frame construction of Fig. 2A which is also intended to support the sensor during subsequent fabrication thereof, parts being removed in order to show better the construction of the frame and the superimposed screen or mask;

Fig. 3 is a plan view of the humidity sensing element at the conclusion of one stage of its manufacture, the element so depicted being capable of practical use as a sensor;

Fig. 4 is a sectional view taken in the direction of lines 4—4 of Fig. 3, the view being greatly enlarged over that appearing in Fig. 3;

Fig. 5 is a sectional view resembling Fig. 4 but showing a more advanced stage of manufacture than that pictured in Fig. 4;

Figure 10:
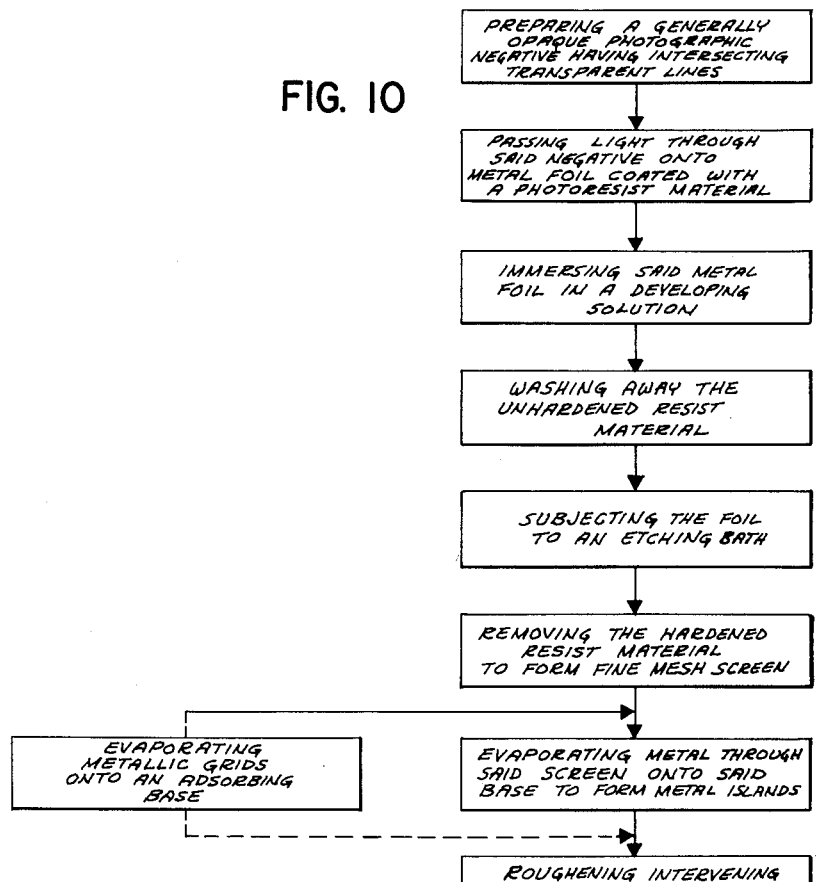

Fig. 6 also resembles Fig. 4 in its construction but here again depicts a more advanced stage of manufacture than does Fig. 4, the present figure embodying a somewhat different step than that incorporated into the production of the sensor appearing in Fig. 5;

Fig. 7 is actually what is a combination of both Figs. 5 and 6;

Fig. 8 is a still more magnified view which is similar to Fig. 6, the view being so dimensioned as to illustrate a particular type of hydrophobic material placed on top of one of the metallic islands;

Fig. 9 is a view resembling somewhat the view of Fig. 8 but showing a superimposed material that is not hydrophobic in its action although it is of the same material as that pictured in Fig. 8, and Fig. 10 is a flow sheet of the process that may be employed in practicing the invention.

Figure 2A:
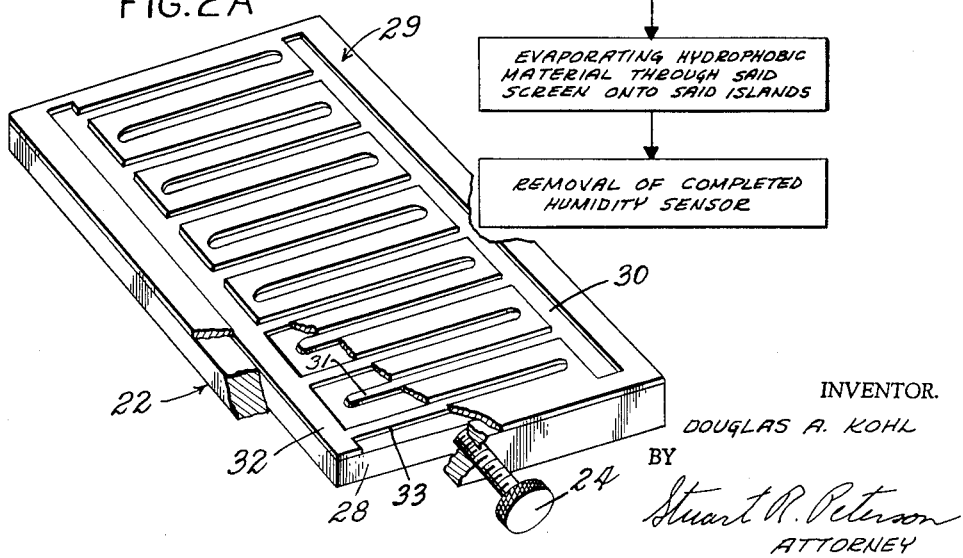
Fig. 2A is a perspective view illustrating a frame for holding the element during the formation of the interleaved grids, there being a mask superimposed having openings of such configuration as to produce the grids.

Referring in detail to the drawings, there is set forth a certain apparatus by which the method presently to be described may be practiced. In this connection attention is first directed to Fig. 1 where there is illustrated suitable apparatus for carrying out the objects in part of the invention, this apparatus suggestively including a supporting base or table 10 upon which is mounted a housing 12. The housing may assume a variety of configurations but in the present instance has been shown as taking the form of a bell-jar or a semispherical dome having a bottom opening and a closed top, the bottom opening confronting the base 10 in an air-tight manner. For the purpose of evacuating air from the housing 12, there is provided a nipple or opening 14 to which an exhaust pump (not shown) is attached. Within the housing 12 is a stand or fixture 16 comprising an upright rod 18 and horizontally projecting arms 20. Resting upon the arms 20 is a sensor holding frame 22, the details of which are better shown in Fig. 2. It will be observed from Fig. 2 that the frame 22 has at one end a set screw 24 threaded therethrough so as to abut against the sensing element designated in its entirety by the numeral 26. All that the set screw 24 does is to force the opposite end of the humidity sensing element 26 tightly against the remote end of the frame 22 so that it can be held during fabrication of the element.

The humidity sensing element has as a base a piece of adsorbing material such as high silica glass or quartz which bears the reference numeral 28. Upon the upper surface of the base 28 appears a pair of electrically conductive grids 30 and 32, these grids including interleaved fingers 31 and 33. While the metallic grids 30 and 32 may be applied to the surface of the base 28 in a variety of ways for the purpose of discussion, we will assume that these grids have been evaporated onto the base by means of a similarly configured mask 29 (Fig. 2A) which permits the evaporated metal to reach the surface of the base 28. Apparatus for performing such an operation may resemble or duplicate the apparatus set forth in Fig. 1. As will become apparent hereinafter, the grids 30 and 32 need not be applied initially but can be added to the base 28 during a later stage of fabrication.

Adhered or cemented to the upper side of the frame 22 as viewed in Fig. 2 is a fine meshed screen 34. The screen 34 is composed of intersecting filaments 36 and 38. Inasmuch as these filaments 36 and 38 are exceedingly fine, leaving minute square openings therebetween, the method by which the screen 34 is prepared is of considerable importance. Accordingly a preferred way of making the screen 34 consists of forming the desired pattern on a photographic negative (not shown) which has thereon a multiplicity of opaque or dense areas separated by intersecting transparent lines. By placing the negative on top of a metal foil having a layer of what is commonly termed a "photoresist" material thereon such as bichromated alubumen, glue, gelatin, gum, resin, colloid, or the like, all of which are adapted to be modified under actinic radiation, the transmission of light through the transparent portions of the negative, that is the transparent lines previously alluded to, permits the transmitted light to impinge upon this light sensitive material. Those areas that are to produce metallic islands in the final or ultimate fabrication of the sensor will not pass light and accordingly the resist material in these regions is not modified by the light action. On the other hand, the transparent lines permit light to pass therethrough and such passing of light causes a modification of the resist material so that when the metallic film, together with its light sensitive material, is placed in a developing solution it is only those regions formed by the transparent lines, that is those regions that have been exposed to light, which will be hardened by the solution, leaving the remaining areas in the form of isolated islands. These isolated islands or small separated areas remain soft or unhardened and can be readily removed in the developing solution by a washing thereof by the solution itself. After removal of this soft or unwanted resist material, the treatment proceeds in the form of placing the metallic foil and the modified resist material thereon in an acid etching or electro forming bath so that the metal is removed from these various isolated areas or regions. This action is what forms the small openings in the screen 34. After this step has been consummated then the photosensitive material that has been hardened can be removed, as by immersion in a lye solution, leaving only the crisscrossing exposed metallic filaments that have previously been designated by the numerals 36 and 38.

As earlier stated, the base element 28 can suggestively be of high silica glass or quartz. However, other materials may be found suitable. The criteria surrounding the selection of materials is that an adsorbing surface be presented for the eventual measuring of humidity conditions. It may be explained that the term "adsorbing" is herein defined, in contradistinction to "absorbing," as including a characteristic in which there is a preferential attraction for water vapor molecules and while these molecules are in contact with the adsorber there is no chemical change and no irreversible action. Absorption, on the other hand, occurs when water vapor molecules are actually combined through chemical reaction with the absorber, incorporated into the molecular structure of the absorber (for instance, water of crystallization), where there is a release of ions by virtue of a binding action such that the conduction of electric current by the ions may result in physical changes. Typical of such reactions are the swelling of cellulose and ion-exchange resins.

With the foregoing in mind, it can now be stated and understood, it is believed, that many adsorbing surfaces will provide a resistance range that is excessively high in value for proper and inexpensive instrumentation. To lower this range and still utilize inexpensive materials for the element 28 presents quite a problem and it is with the solution of this problem that this application is primarily concerned. As can be seen from an inspection of Fig. 2, the grids 30 and 32 which are applied to the upper surface of the element 28 have their fingers 31 and 33 spaced apart somewhat and there will of necessity, without employing the teachings of the present invention, have to be a certain collection of moisture molecules between the interleaved fingers before the lower end of the resistance range will be obtained. To lower the over-all resistance range, the invention contemplates the application or depositing of very small minute electrically conductive islands between the interleaved fingers 31 and 33 in a uniform manner.

Proceeding with that part of the invention which involves the application of these small islands to the adsorbing element 28, reference is once again to be made to Fig. 1. In this particular figure the frame 22 is inverted with respect to its position shown in Fig. 2. Thus it will be appreciated that the screen 34 is facing downwardly and that the back of the element 28 is uppermost. Beneath the frame 22 in Fig. 1 is a first boat or crucible 40 containing a noble metal 42. The operation of the boat 40 is in accordance with well-known principles, there passing through the boat an electric current which heats the boat by electrical resistance action. Of course, other modes of heating may be utilized if desired. At any rate owing to the evacuated condition of the housing 12, the small metallic particles of molecular size proceed upwardly from the boat 40 in all directions, many of them striking the surface of the element 28 having thereon the grids 30 and 32. However, access to this adsorbing element is only via the small openings in the screen 34, the filaments 36 and 38 obstructing the passage of any vaporized metal that might attempt to land on the element 28 where no metal is desired. Either before or after the foregoing, the grids 30, 32 may be applied. The technique is the same, though the mask 29 being employed instead of the screen 34.

As a result of the above action a myriad of small metallic islands designated by the numeral 44 are added to the surface having the grids 30 and 32 thereon. These islands are completely separated one from the other by intervening paths 46. The intervening paths 46 are left barren of evaporated metal by virtue of the presence of the filaments 36 and 38. Of course, a number of the islands 44, as can be seen from Fig. 3, are superimposed upon the interleaved grid fingers 31 and 33 but of course this is not objectionable in any sense of the word, these superimposed islands merely adding to the conductivity of the grids 30 and 32. The point to be emphasized here is that the paths 46 still leave adsorbing regions exposed to the humid atmosphere when the sensor 26 is used in the measurement of relative humidity. Consequently, molecular water vapor need only bridge, literally speaking, those paths 46 which extend between the adjacent islands 44, for the islands as mentioned above are electrically conductive and any moisture resting thereupon does not actually take part in the humidity reading, being shorted or shunted by those islands subjacent thereto. Attention is directed to Fig. 4 where certain of the islands 44 are greatly enlarged and it can be seen somewhat better that the paths 46 are devoid of any deposited metal.

The collection of water on the paths 46 may be enhanced by roughening the surface constituting these various paths. Therefore, it may be stated that the present invention envisages the added step of roughening these paths and to this end the frame 22 may be immersed, preferably without removal of the sensor 26 therefrom as will hereinafter become clearer, in an etching bath so that the paths 46 are roughened as they appear in Fig. 5. To distinguish the roughened paths from the earlier described smooth paths 46, the small letter "a" has been appended to the numeral 46. It will, of course, be understood that the acid used in etching or forming the paths 46a is selected so that it will not etch away any appreciable amount of the metal constituting the islands 44. Hence, as clearly pictured in Fig. 5, the islands 44 remain unmodified although the paths 46a are roughened in the above described manner.

In the above paragraph it has been stated that the frame 22 is immersed in the etching solution without removal of the sensor 26. In this regard, the invention also embraces another fabrication step. However, it is possible in some instances to forego this added step which is about to be described, then utilizing the humidity sensor as it appears in Fig. 5. Further, it may be pointed out that the process is also of value when applied to surfaces that have been previously ground or etched.

Before describing the added step mentioned above, the invention lends itself more readily to a description of what is actually a second step that might be employed in lieu of the etching procedure. In this regard, attention is focused now upon Fig. 6 which will be considered in conjunction with Fig. 1. Referring first to Fig. 1, there is employed at this time a second boat or crucible 48 which may be identical with the earlier mentioned boat 40. Instead of the noble metal 42 the boat 48 has contained therein a hydrophobic material 50. This material 50 may be in the form of a metal or non-metal as will hereinafter be made manifest. At this particular moment, though, it will be assumed that the material is selected from a group of materials of which the following are typical: silicon monoxide, ammonium bromide, antimony trichloride, or selenium. In the carrying out of this step, the screen or mask 34 remains in its cemented position on the frame 22 and since it is desired to superimpose the hydrophobic material onto the islands 44 it is essential that the element 28 within the frame 22 not be displaced relative to said screen or mask. Consequently, the set screw 24 remains in a tight condition so that the element 28 is held fast within the frame 22.

Heating of the material 50 contained in the boat 48 causes molecular particles of this material to rise and many of these particles will strike the element 28. Since the filaments 36 and 38 of the screen 34 remain as effective shields against any evaporated material striking the surface of the element 28 constituting the paths 46, it will be appreciated that the hydrophobic material can only pass through the openings intermediate the filaments 36 and 38 and thus take the exact avenue that the previously referred to metallic particles took in forming the islands 44. Hence the superimposed material is coextensive in area with these islands and in Fig. 6 it will be observed that the superimposed areas of hydrophobic material have been given the numeral 52.

At this time it is believed helpful to explain what is intended by the word "hydrophobic." Such a material is one which has a minimal adsorption bond for water molecules. Stated more generally, a hydrophobic layer has a very pronounced abhorrence of water by virtue of accentuating the self-cohesive property of water itself.

While either the roughened paths 46a may be incorporated into the humidity sensor 26 or the superimposed areas 52 may be utilized individually and distinct from one or the other, nonetheless the invention envisages in a preferred form the combination of both the etched paths 46a and the superimposed areas 52. This accounts for the earlier presented statement that the etching should take place without the removal of the element 28 from its frame 22. By leaving the element 28 in the frame 22 it can be seen that the etched paths 46a may be formed and the element 28 replaced on the arms 20 within the housing 12 for the additional step of evaporating a hydrophobic material 50 thereonto in a superimposed relation with the islands 44. Accordingly, reference should be made to Fig. 7 where the etched paths 46a appear in combination with the superimposed hydrophobic areas 52. Of course it will be understood that Fig. 7 embodies a combination that provides benefits derivable from both of these features, and therefore, as already stated, is a preferred embodiment of the invention.

Falling within the previously given definition of "hydrophobic" are various metals which may be deposited in such a way as to act as hydrophobic. For example, a rapidly evaporated and condensed layer of gold on a cold substrate might render the layer adsorptive in nature, whereas a slow condensation of the same metal on a hot substrate will, under controlled conditions, produce a surface which has no inherent attraction for water vapor molecules and hence would fall into the category of being hydrophobic. In Fig. 9 there is shown a layer designated by the reference numeral 52b which has a surface configuration which is adsorptive in character having a plurality of voids or crevices labelled 54 which provide sites for adsorption. In Fig. 8 the same metal has been evaporated onto a hot substrate, that is the islands 44, by a slow condensation procedure and this layer has been given the reference numeral 52a. As can be seen from this magnified view in Fig. 8, the metal constituting the layer 52a is relatively devoid of any crevices which might form sites for the adsorption of water vapor, and consequently would have the tendency to shed moisture, thereby increasing the amount of moisture on either the paths 46 or 46a, as the case may be.

It might also be explained that the respective functions of the islands and hydrophobic material may be combined, the evaporation of the islands 44, using, say, gold being performed then by evaporating onto a hot substrate, that is the element 28 in a heated condition.

As above pointed out, when forming a hydrophobic covering by metallic evaporation the element 28 is to be heated. In this regard the degree of heating is governed by the ability of the element to withstand elevated temperatures without damage. In some instances this temperature can be as high as 800° C. Also, the evaporation as hereinabove explained should be at a relatively slow rate, controllable by varying the temperature of the boat 40 by way of reducing its electrical heating current.

It might also be explained that the respective functions of the islands and hydrophobic material may be combined, the evaporation of the islands 44 using a metal, for instance gold, then being performed by evaporating such metal directly onto the element 28 rather than onto previously applied metallic islands that are not hydrophobic in nature.

From the foregoing description it is believed evident that by reducing the inter-grid spacing the resistance is lowered. With the described method the islands may be deposited with such precision as to their spacing that they are only a few microns apart. Since the magnitude of the decrease in inter-grid spacing is directly proportional to the ratio of the open area of the screen to the filament area, the only requirement of this system is that the dimensions of the open area be less than the spacing of the interleaved fingers of the grids.

In mass producing sensors in accordance with the invention, it can be appreciated that re-use of the screens or employment of screens made from the same photographic negative will result in substantial duplication of the island pattern. Hence, the operational characteristics will also be duplicated, thereby obviating the necessity for re-calibration of the associated instruments when one sensor is substituted for another. Also, with reference to additional mass production techniques, it may be mentioned that in some instances it will be desirable to etch, or roughen by grinding, the element 28 prior to the application of either the islands or the hydrophobic material, thereby in effect producing a roughened path pattern similar to the paths 46a shown in Fig. 7.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A method of making a humidity sensor comprising the steps of applying interleaved metallic grids to one surface of an adsorbing element, evaporating metal through a mask having a plurality of relatively small openings therein so as to form a plurality of metallic islands on said adsorbing surface, evaporating hydrophobic material through said same mask without displacing said mask from the position assumed during the formation of the islands so as to produce a plurality of superimposed hydrophobic areas on said islands, and etching the adsorbing surface intermediate said islands, the second evaporating and etching steps being performed in any desired sequence.

2. A method in accordance with claim 1 in which the etching step is performed before the second evaporating step and said mask is held against displacement during said etching step.

3. A method in accordance with claim 1 in which the second evaporating step is performed before the etching step and the etching solution is selected so as not to react with said hydrophobic material.

4. A method making a humidity sensor comprising the steps of evaporating metal in the form of relatively small islands onto one surface of an adsorbing element, etching the regions intermediate the islands, and applying interleaved metallic grids to said surface, the steps of forming said islands and grids being performed in any desired sequence and the etching step being performed after the formation of said islands.

5. A method of making a humidity sensor comprising the steps of applying interleaved metallic grids to one surface of an adsorbing element, evaporating a multiplicity of metallic islands onto said element through the openings of a fine mesh screen disposed directly in front of said adsorbing element, etching the adsorbing surface so that the regions between said islands will be roughened, and evaporating hydrophobic material through said same screen without displacing said screen from the position assumed during the formation of the islands so as to produce a multiplicity of superimposed hydrophobic areas on said islands.

References Cited in the file of this patent

UNITED STATES PATENTS

| | | |
|---|---|---|
| 2,055,017 | Praetorius | Sept. 22, 1936 |
| 2,217,334 | Diggory et al. | Oct. 8, 1940 |
| 2,320,327 | Meduna | May 25, 1943 |
| 2,320,328 | Meduna | May 25, 1943 |
| 2,435,889 | Kerridge | Feb. 10, 1948 |
| 2,516,916 | Richards | Aug. 1, 1950 |
| 2,543,384 | Squier | Feb. 27, 1951 |
| 2,613,302 | Gurewitsch | Oct. 7, 1952 |
| 2,707,880 | Wannamaker | May 10, 1955 |
| 2,726,305 | Craig | Dec. 6, 1955 |
| 2,730,639 | Johnson | Jan. 10, 1956 |
| 2,739,084 | Sommer | Mar. 20, 1956 |
| 2,745,773 | Weimer | May 15, 1956 |